United States Patent [19]

O'Malley

[11] Patent Number: 5,433,361
[45] Date of Patent: Jul. 18, 1995

[54] OSCILLATING BEVERAGE CONTAINER HOLDER WITH COLLAR EXTENSION

[76] Inventor: Michael P. O'Malley, 554 W. 8 St., Dubuque, Iowa 52001

[21] Appl. No.: 199,725

[22] Filed: Feb. 22, 1994

[51] Int. Cl.$^6$ ................................................. B60R 9/00
[52] U.S. Cl. .................................... 224/274; 224/558; 224/926; 248/311.2
[58] Field of Search .................... 224/274, 30 A, 32 R, 224/33 R, 39, 41, 42.45 R, 42.46 R; 211/74, 81, 85, 113, 116; 248/311.2

[56] References Cited

U.S. PATENT DOCUMENTS

| | | | |
|---|---|---|---|
| 3,131,842 | 5/1964 | Dingle, Jr. et al. | 224/274 |
| 3,313,508 | 4/1967 | Mancl | 224/274 X |
| 3,734,439 | 5/1973 | Wintz | |
| 3,844,459 | 10/1974 | Chambers | 224/274 |
| 4,459,827 | 7/1984 | Rhodes | |
| 4,844,399 | 7/1989 | Harm | |
| 5,105,958 | 4/1992 | Patton | |
| 5,152,489 | 10/1992 | Christensen et al. | 248/311.2 |
| 5,320,263 | 6/1994 | Kobylack | 224/274 |

OTHER PUBLICATIONS

The Sporting News Dealer, Feb. 1972 p. 199.

Primary Examiner—J. Casimer Jacyna
Assistant Examiner—Steven O. Douglas

[57] ABSTRACT

An oscillating beverage holder which includes a collar extension that attaches by friction adherence obtained by placing the collar extension around the tubular section of a golf bag pull cart. Then tightening of a bolt that passes through a hole on each side of the collar extension with a nut. A specially molded beverage holder consisting of two cylinder type cavities, a divider and an extension wall all molded as one. The cylinder cavities are designed to keep the beverages at a more constant temperature. The cavities are also large enough to allow the beverage containers to be covered with an insulation type wrap before being placed in the beverage cavities which would keep the beverages cooler/warmer even longer. The extension wall protrudes from the divider and is carried within the extension collar. A hole is located towards the top of the extension wall and another set of holes are located in the collar extension, once the holes are aligned, a shoulder bolt is inserted and secured by a shoulder bolt nut. Tightening of the nut results in the collar extension being fasten secure to shoulder bolt, but does not secure the extension wall allowing the specially molded beverage holder to oscillate when the golf bag pull cart is in motion.

4 Claims, 4 Drawing Sheets

OSCILLATING BEVERAGE CONTAINER HOLDER WITH COLLAR EXTENSION

CROSS-REFERENCES TO RELATED APPLICATIONS

This invention relates to a beverage container holder and is intended to support beverages in a suspended, upright, and oscillating manner from a golf bag pull cart, by means of a special molded mounting bracket and beverage holder which is designed to keep beverages cooler/warmer, longer.

For example U.S. Pat. No. 4,844,399, discloses a beverage holder which attaches to a tubular section of a golf bag pull cart by means of a flexable strap. This beverage holder consists basically of four equally spaced straps attached to a circular pivoting rod, which is inserted into the mounting bracket, which holds the beverage container and allows it to rotate upon movement of the golf bag pull cart.

U.S. Pat. No. 3,734,439, discloses a device for holding a single beverage by means of a U-shaped bracket to a tubular section of a golf bag pull cart. This device for holding the beverage container basically consists of vertical and horizontal wires to contain the beverage within.

It is evident that the aforementioned patents, although Pivot they do not provide any means of keeping beverages cooler/warmer longer.

It is a further object of the present invention to maintain a lower center of gravity so as not to upset the golf bag pull cart from it's upright position.

A still further object is having a beverage holder that is allowed to oscillate thus keeping the beverage container in an upright position without being able to oscillate enough to eject the beverage container from it's holder.

A still further object is to provide a golf bag pull cart beverage holder that oscillates beverages as one unit not as separate entities, thus avoiding stress due to contrasting movement.

BRIEF SUMMARY OF THE INVENTION

This invention relates to a beverage holder which may be attached to the tubular section of a golf bag pull cart. There is a special molded collar extension that attaches by friction adherance around the tubular section. A bolt is placed through the holes in the collar extension and tightened with a nut, thus securing the collar extension to the tubular section of a golf bag pull cart.

There is an extension wall which protrudes from the divider of the oscillating beverage holder that is slid between the collar extension. At the top of the extension wall is hole, this hole aligns up with two shoulder bolt holes in the collar extension. Once the holes are aligned a shoulder bolt is inserted and a shoulder bolt nut is fastened to secure the sides of the collar extension to the shoulder bolt, thus leaving a gap between the extension wall and the collar extension allowing the invention to oscillate.

The divider is used to separate two beverage cavities which will allow for easy insertion and extraction of beverage containers. The two beverage cavities, the extension wall, and the divider are molded as one body. By being molded as one body allows the beverage containers to be encased on the sides and the bottoms, thus keeping the beverages cooler/warmer longer. The beverage cavities are large enough that an insulating type wrap can be used to encase the beverage containers before being placed in the beverage holder, thus keeping the beverages cooler/warmer even longer.

NUMERICAL DEFINITION LIST

2 Tubular Section
4 Collar Extension
6 Collar Extension Bolt
8 Collar Extension Nut
10 Shoulder Bolt
12 Shoulder Bolt Nut
14 Oscillating Beverage Holder
16 Extension Wall
18 Divider
20 Cylinder Beverage Cavity
22 Golf Bag Pull Cart
24 Collar Extension Bolt Hole
26 Collar Extension Shoulder Bolt Hole
28 Extension Wall Shoulder Bolt Hole
30 Spacing Gap

DETAILED DESCRIPTION

Figure 1:
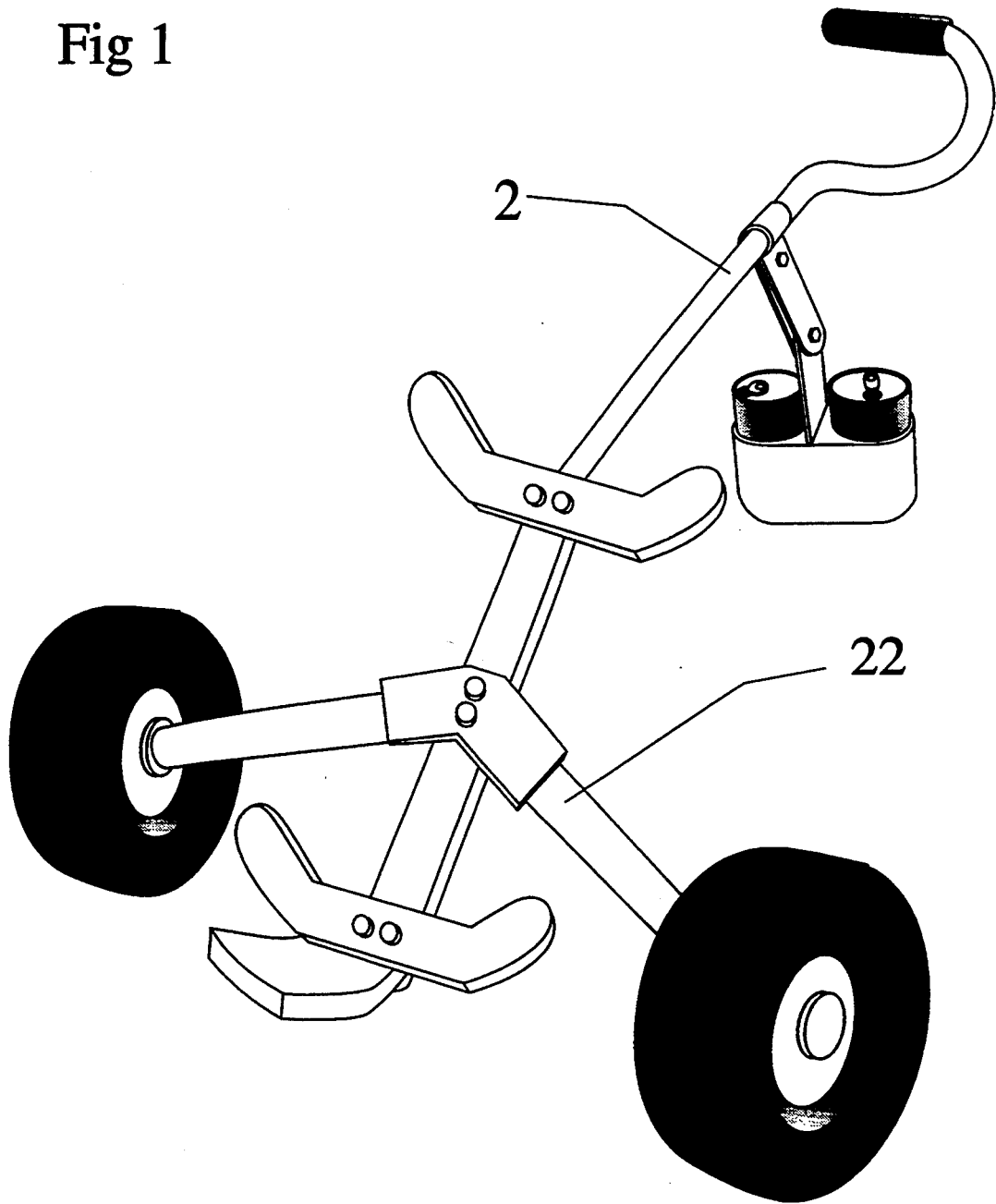
FIG. 1 is a perspective view of an oscillating beverage container holder affixed to a tubular section of a golf bag pull cart.
Figure 2:
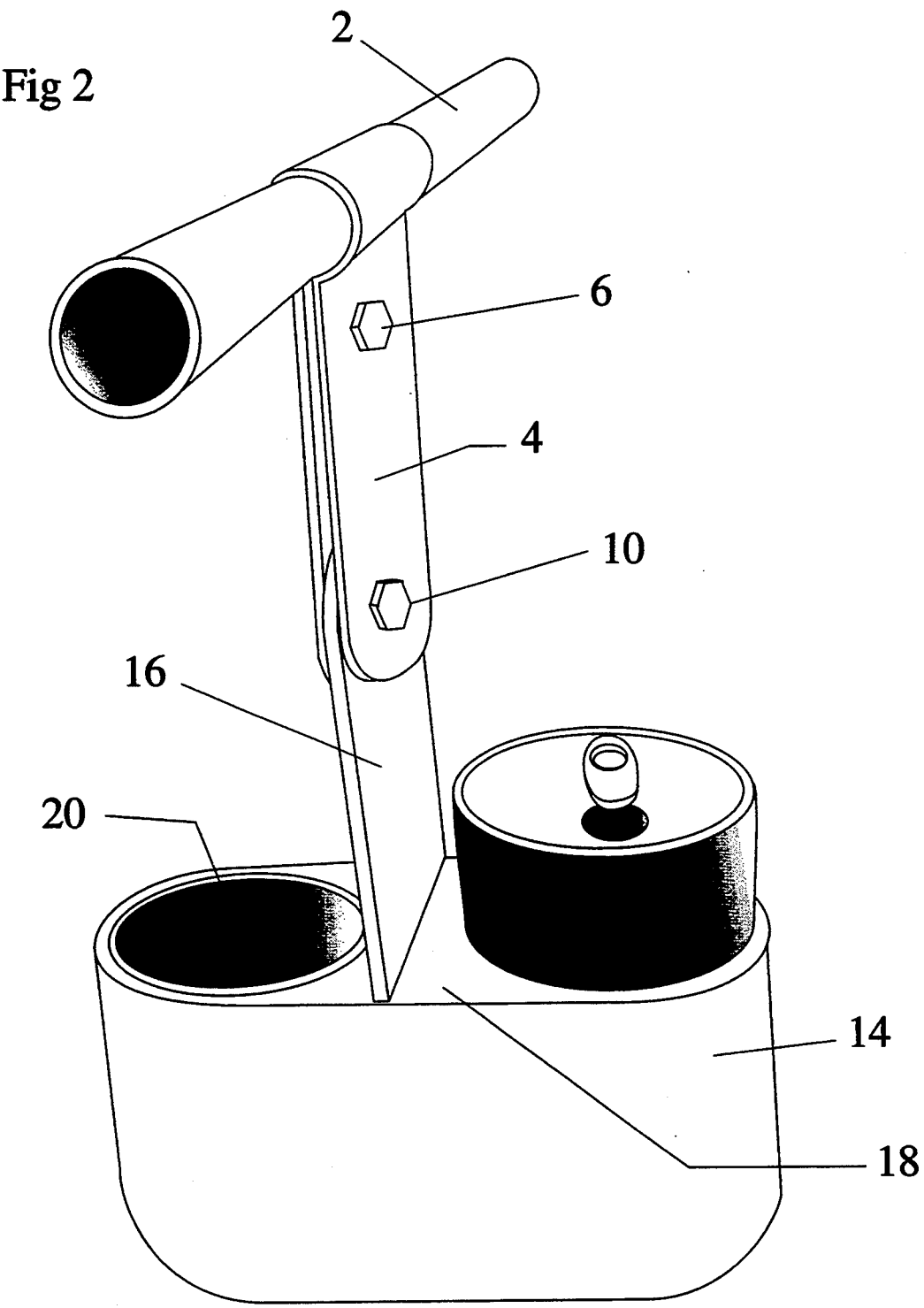
FIG. 2 is an explicit view of the invention consisting of the collar extension being attached to a tubular section with a bolt and the oscillating beverage container holder being carried between the collar extension by a shoulder bolt.
Figure 3:
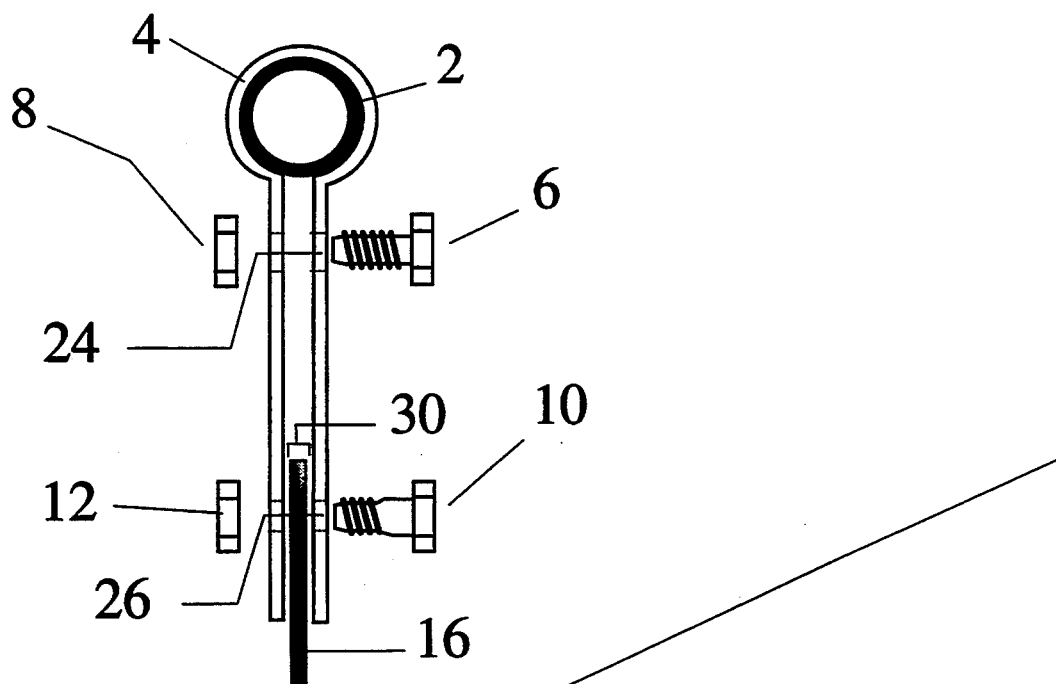
FIG. 3 is a front view of the collar extension affixed to a tubular section with a bolt and nut. Also a view of the extension wall being carried by a shoulder bolt and nut from the collar extension, and a more explicit view of the bolt and nut, also the shoulder bolt and nut.

FIG. 1 shows a drawing of a golf bag pull cart 22 with a view of the invention attached to a tubular section 2. FIG. 2 shows a tubular section 2, a collar extension 4, a collar extension bolt 6, a shoulder bolt 10, an extension wall 16, a divider 18, two cylinder beverage cavities 20, and the oscillating beverage holder 14. The collar extension 4 goes around the tubular section 2 and is affixed by a collar extension bolt 6. The collar extension bolt 6 passes from one side of the collar extension 4 to the other by means of holes molded in the collar extension 4, this view can be seen a little better in FIG. 3 and FIG. 4. Once the collar extension bolt 6 is in place, a collar extension nut 8 is used to fasten secure the collar extension 4 to the tubular section 2. The extension wall 16 is slide between the collar extension 4 (shown in FIG. 3) until the extension wall shoulder bolt hole 28 (shown in FIG. 6) aligns up with collar extension shoulder bolt hole 26.

Once the holes are aligned up, a shoulder bolt 10 is inserted and a shoulder bolt not 12 is used to fasten secure the collar extension 4 to the shoulder bolt 10, without tightening the extension wall 16 which allows the invention to oscillate.

The extension wall 16 is molded to the divider 18 which separates the cylinder beverage cavities 20. The cylinder beverage cavities 20 are spaced apart far enough so that the beverage containers can be removed without any obstruction from the tubular section 2. The cylinder beverage cavities 20 are one of the crucial points of this invention, they are a specially molded plastic which maintains a more constant temperature of the beverages longer. The cylinder beverage cavities 20 are larger than the conventional beverage containers, this allows for an insulating type wrap to be placed around the containers before being placed in the oscilating beverage holder 14, this will result in keeping the beverages cooler/warmer even longer.

The oscillating beverage holder 14 not only keeps the beverages cooler/warmer longer, but it does it while at the same time keeping the beverages in an upright position when the golf bag pull cart 22 is in motion. The oscillating beverage holder 14 is one specially molded body consisting of an extension wall 16, a divider 18 and two cylinder beverage cavities 20. Now referring to FIG. 3 this view shows the collar extension bolt 6, the collar extension nut 8, the shoulder bolt 10, the shoulder bolt nut 12, and a view of the tubular section 2 with the collar extension 4 being fasten around it by the collar extension bolt 6 and the collar extension nut 8. There is also a view of the extension wall 16 slid up between the collar extension 4 until the collar extension shoulder bolt holes 26 and the extension wall shoulder bolt hole 28 line up, then a shoulder bolt 10 is slid in place and fasten secure by a shoulder bolt nut 12. With the collar extension 4 fasten secure to the shoulder bolt 10 a spacing gap 30 results leaving the extension wall 16 of the oscillating beverage holder 14 to oscillating freely.

Figure 4:
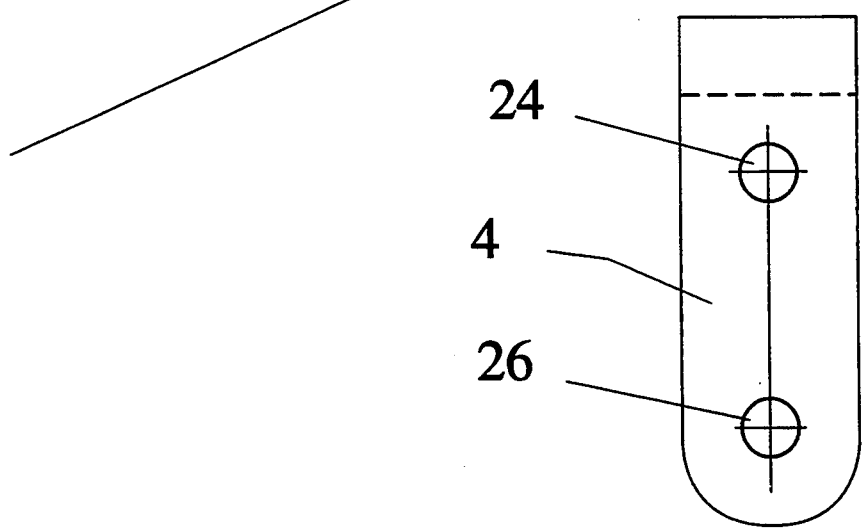
FIG. 4 is a side view of the collar extension, and the bolt holes.

FIG. 4 is a side view of the collar extension 4 with a view of the collar extension bolt hole 24 and the collar extension shoulder bolt hole 26.

Figure 5:
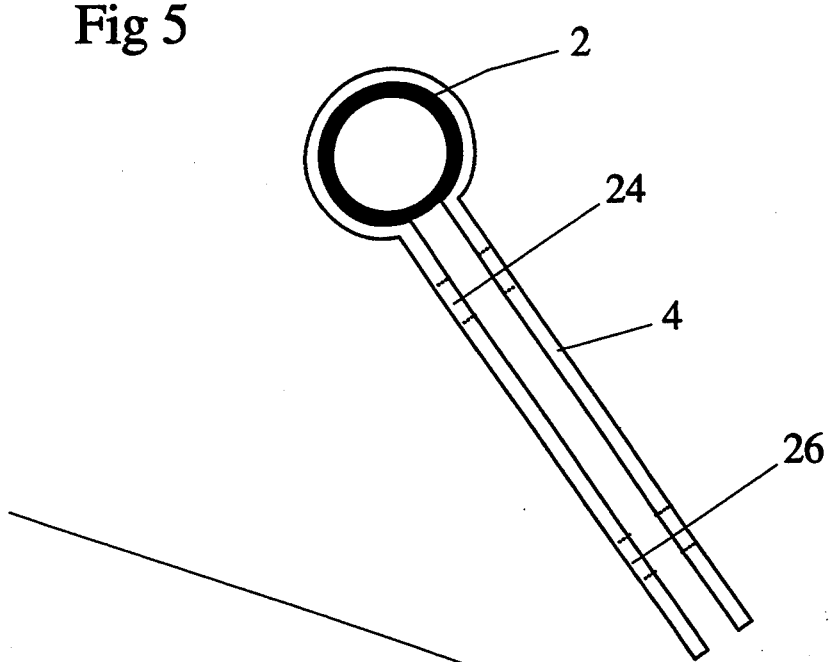
FIG. 5 is a front view of the collar extension illustrating placement of the collar extension bolt holes and the collar extension shoulder bolt holes.

FIG. 5 shows a view of the collar extension 4 placed around a tubular section 2 with perspective collar extension bolt holes 24 and the collar extension shoulder bolt holes 26.

Figure 6:
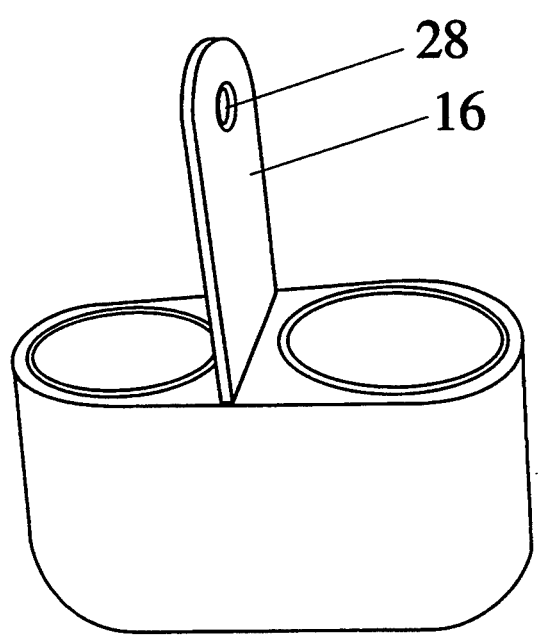
FIG. 6 is an angled view of the oscillating beverage container holder illustrating the extension wall shoulder bolt hole.

FIG. 6 depicts the extension wall 16 and the extension wall shoulder bolt hole 28 of the oscillating beverage holder 14.

I claim:

1. A device for transporting beverages in an upright position which mounts to the tubular handle section of a golf bag pull cart, comprising:
   (a) a collar extension passing around and secured to the tubular handle section of the pull cart;
   (b) a body of molded plastic having two cavities, a divider and an extension wall; and
   (c) a shoulder bolt and nut extending through apertures in said collar extension and extension wall for pivotally securing said extension wall to said collar extension.

2. The device as received in claim 1 wherein the cavities of said body are formed large enough to accommodate beverage containers with an insulating type foam cover.

3. The device as recited in claim 2 wherein said cavities are spaced apart a sufficient distance to allow the beverages to be inserted and removed without obstruction from the tubular handle section of the golf ball pull cart.

4. The device as recited in claim 3 wherein said extension wall is molded to the top of the divider and projects upward and has a hole in the upper portion to accommodate said shoulder bolt.

* * * * *